Oct. 18, 1966
W. S. KINNARD
3,279,348
PORTABLE CARRIER OR DOLLY FOR PHOTOGRAPHIC EQUIPMENT
Filed Aug. 2, 1963
2 Sheets-Sheet 1
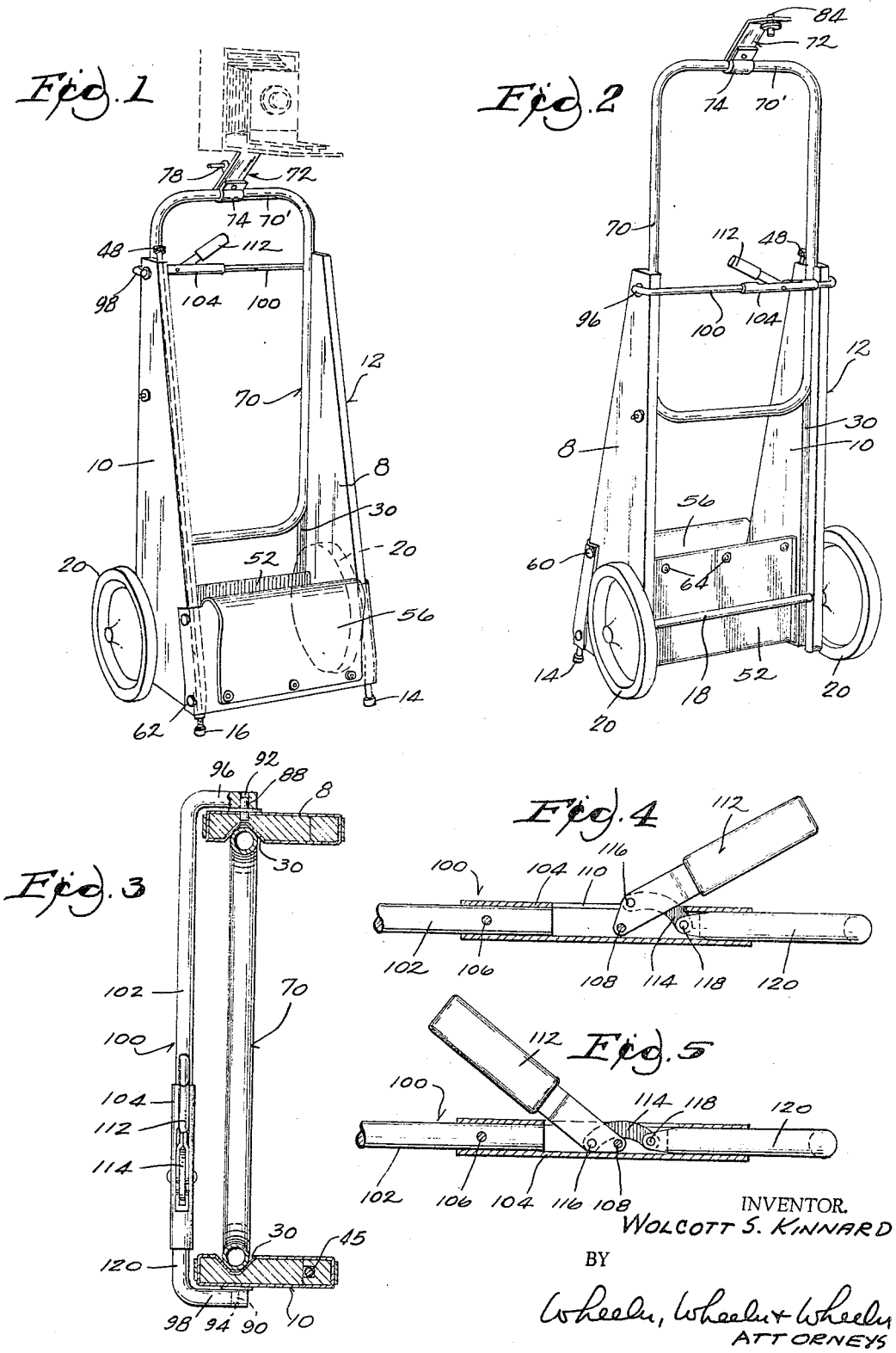
INVENTOR.
WOLCOTT S. KINNARD
BY
Wheeler, Wheeler & Wheeler
ATTORNEYS Oct. 18, 1966  W. S. KINNARD  3,279,348
PORTABLE CARRIER OR DOLLY FOR PHOTOGRAPHIC EQUIPMENT
Filed Aug. 2, 1963  2 Sheets-Sheet 2
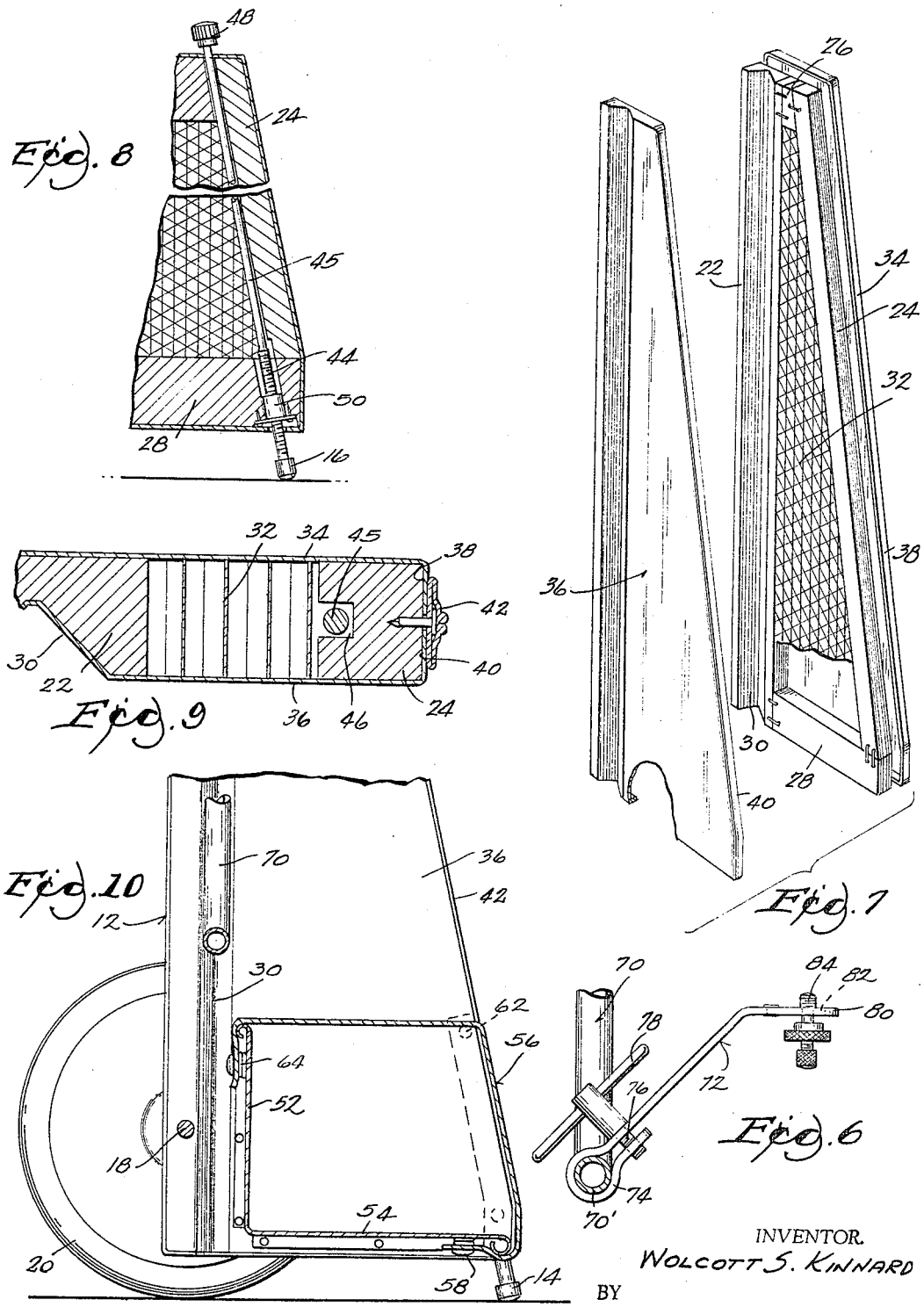
INVENTOR.
WOLCOTT S. KINNARD
BY
Wheeler, Wheeler & Wheeler
ATTORNEYS United States Patent Office 3,279,348
Patented Oct. 18, 1966

3,279,348
PORTABLE CARRIER OR DOLLY FOR
PHOTOGRAPHIC EQUIPMENT
Wolcott S. Kinnard, 4665 N. 56th St., Milwaukee, Wis.
Filed Aug. 2, 1963, Ser. No. 299,517
6 Claims. (Cl. 95—86)

This invention relates to a portable carrier or dolly for photographic equipment.

In the preferred embodiment of the invention, the device serves primarily in lieu of a tripod but it may also be used to carry a very great deal of ancillary equipment such as batteries, cameras, films, lights, etc. It is provided with two wheels but is extremely light in weight to facilitate bodily movement to and from a vehicle or up or down stairs.

The wheeled frame has side members connected at their bottom ends and having upright ways in which a generally rectangular subframe is vertically reciprocable. A toggle lever tie bar draws the yieldable upper ends of the side members into clamping engagement with the subframe to hold it in any position of vertical adjustment, the clamping tie bar constituting the only connection between the side members throughout a major portion of their height.

A readily releasable bracket can be clamped to any bar of the subframe to carry a conventional camera tripod socket. The camera may be mounted on the top bar or the bottom bar of the subframe and may be adjusted to any angle in a vertical plane. Since the side of the apparauts adjacent the subframe is vertical, the camera may be directed downwardly toward the floor or other support for copy work.

The respective side members are conveniently made of wooden framing elements with a central honeycomb core, opposite sides of each side member desirably being sheathed in artificial leather or the like. The side members are preferably generally triangular in elevation, being wider in a fore and aft direction at the bottom of the device than at the top thereof. They have feet which cooperate with the wheels in positioning the device and at least one of these feet is carried by an adjusting rod having a portion desirably threaded to a nut in the side member of the frame to facilitate levelling adjustment.

A shelf comprising a bottom wall and a rear wall connects the side members at the level of the wheels and a detachable flexible covering is releasably connected by snap fasteners to the horizontal and vertical elements of the shelf, as well as to the side members of the frame for confining and enclosing the contents of the shelf.

In the drawings:

FIG. 1 is a view in three-quarter perspective of a device embodying the invention as it appears when set up for use with the camera mounted thereon.

FIG. 2 is a fragmentary three-quarter perspective looking at the other side of the device with the frame reversed in its ways so that the camera may be directed oppositely or turned toward the ground for copy work.

FIG. 3 is an enlarged fragmentary detail view in horizontal section showing the manner in which the subframe is clamped.

FIG. 4 is a further enlarged fragmentary detail view showing the clamping member in its released position.

FIG. 5 is a view similar to FIG. 4 showing the clamping member in its tightened position.

FIG. 6 is a detail in side elevation of the camera supporting bracket, the subframe being fragmentarily illustrated.

FIG. 7 is a view in perspective showing separated components of one of the side members of the frame, portions being broken away.

FIG. 8 is an enlarged fragmentary detail view in section showing the adjustable front leg.

FIG. 9 is a fragmentary detail view on an enlarged scale taken in horizontal section through one of the frame side members.

FIG. 10 is an enlarged fragmentary detail view taken in vertical front and rear section through the shelf elements which connect the side members of the frame.

When the device embodying the invention is at rest as shown in FIGS. 1 and 2, its frame 12 is suppported at the front by feet 14 and 16 and at the rear by an axle 18 provided with wheels 20.

The frame comprises laterally spaced side members 8 and 10 preferably made of wood upright framing elements 22 and 24 joined at top and bottom by framing elements 26 and 28 in skeletonized form as best shown in FIG. 7. The framing elements 22 are vertical and grooved to provide ways 30 extending, preferably, from top to bottom. The space within the framing elements can be filled with a cellular filler as shown at 32 in FIG. 7. The filler is desirably covered by sheath panels 34 and 36 having flanges which meet as indicated at 38 and 40 in FIG. 9, the joint being covered by finishing strip 42.

At one side of the device, the foot 14 is fixed. At the other side, the foot 16 is carried on the threaded portion 44 of a rod 45 for which the element 24 is provided with a channel 46 as shown in FIGS. 8 and 9. The rod has an operating knob 48 at its upper end and at its threaded lower end 44 is engaged in a fixed nut 50.

The axle 18 extends transversely of the vertical side framing elements 22, rearwardly of the ways 30 formed therein. The only relatively rigid connection between the side frame members is provided by screws or bolts attaching to such members the rear wall 52 and the horizontal wall 54 of the shelf structure as best shown in FIG. 10. A flexible enclosure 56 is detachably secured to the horizontal shelf wall 54 by snap fasteners at 58 and is supported from the side frame members by snap fasteners 60 and 62, extending thence rearwardly over the shelf structure and across the top of the rear wall 52 thereof to a connection by means of snap fasteners 64 with the rear wall. FIG. 10 shows the flexible closure in place while FIG. 1 shows the top flap thereof opened to the extent premitted by the still engaged snap fasteners 62 at the sides.

Vertically reciprocable and invertible and reversible from side to side in the ways 30 is a subframe 70 which may conveniently be made of tubular stock with parallel sides and rounded corners as clearly appears in FIGS. 1 and 2. When the subframe is not clamped between the side frame members to fix its position in the ways 30, it is freely movable vertically and may be completely removed from the ways and either inverted or turned around. The subframe 70 carries a bracket 72 with a clamping portion 74 engaged about one of the horizontal bars 70' of the subframe 70 and held thereto by a clamping screw 76 provided with handle 78. A free end portion 80 of bracket 72 angles obliquely and has an opening 82 for a conventional tripod socket screw 84. FIG. 1 shows the bracket 72 extending forwardly of the wheels 20. FIG. 2 shows it extending rearwardly, this latter position being such that a camera mounted thereon can be directed vertically downwardly for copying. If the subframe is completely removed and turned over, the bar 70' thereof to which the clamp portion 74 is clamped will be at the bottom of the subframe as shown in FIG. 6.

At the outsides of the respective side frame members 8 and 10 are laterally projecting studs 88 and 90 engaged in sockets 92 and 94, respectively, in the forwardly projecting arms 96 and 98 of a toggle actuated clamping bar generically designated by reference character 100. This bar comprises a first section 102 with which a slotted sleeve 104 is fixed by cross pin 106. Pivoted within the sleeve on pintle 108 to project through the slot 110 thereof as best shown in FIG. 4 is a hand lever 112 pivotally connected with a link 114 by means of pintle 116. At its other end, the link 114 is connected by pintle 118 with another section 120 of the bar, section 120 being telescopically reciprocable in the sleeve 104. Simply throwing the hand lever 112 from the released position of FIG. 4 to the clamping position of FIG. 5 will exert clamping pressure which draws the side members 8 and 10 together to clampingly engage the sides of the subframe 70 in the ways 30, thus securing it in any adjusted position. When the hand lever is returned to the FIG. 4 position, the side frame members 8 and 10 spring apart, releasing the subframe for reciprocation in ways 30.

The device embodying the invention is so light that it can readily be lifted to and from a vehicle for transportation, even while it has photographic equipment mounted upon it. With the camera in place, the carrier provides a stand which is much more stable than a tripod and much more readily portable and much more easily adjustable as to height and direction of view. The fact that the subframe is not only capable of being raised and lowered but may also be inverted and turned around with respect to the wheeled main frame adds versatility and convenience.

Despite the lightness of the structure it is strong enough to carry heavy batteries on the shelf and these or other photographic equipment can be enclosed by the flexible covering 56.

I claim:

1. A photographic dolly comprising a stand including a frame having side members connected at their lower ends and yieldably movable toward and from each other at their upper ends, said members having complementary ways, a subframe reciprocable in the ways and comprising side, top, and bottom members connected in generally rectangular outline, a camera bracket adjustably clamped to one of said members, and means for clampingly drawing the upper ends of said side frame members toward each other into clamping engagement with the subframe.

2. A photographic dolly according to claim 1 in which a wheeled axle extends transversely of said frame adjacent one side thereof, said frame being provided with relatively fixed feet at the other side thereof.

3. A photographic dolly according to claim 2 in which at least one of the relatively fixed feet has means for adjusting its relatively fixed position for the levelling of the frame, said means including a rod extending substantially the height of the side member provided with such foot and having a threaded portion for which the said last mentioned side member provides a nut.

4. A portable camera support comprising a pair of side members laterally spaced from each other, means providing relatively fixed connection between the lower ends of said side members and from which said side members extend upwardly, having relatively yieldable upper end portions, an axle transversely spanning the side members and provided with supporting wheels, means for drawing the upper end portions of the side members clampingly toward each other, means on the respective side members providing opposite channels constituting ways, a subframe reciprocable vertically in said channels and adapted to be fixed in its position in said ways when said clamping means operative to draw the upper end portions of the side members toward each other, a camera bracket mounted on the subframe, and means cooperating with the wheels for the support of the frame in a fixed position of use.

5. A photographic carrier comprising generally upright side frame members in laterally spaced relationship, means connecting lower end portions of said device to each other, means providing ways extending vertically on the inner sides of the receptive side frame members, a subframe vertically reciprocable in said ways, and means for drawing upper end portions of the side frame members toward each other into clamping engagement with the subframe for fixing the position thereof, said last mentioned means comprising pair of bar elements spanning the space between the upper end portions of the side frame members and having arms engaged with such portions, and toggle linkage for drawing said bar elements toward each other.

6. A carrier according to claim 5 in which one of said bar elements has a sleeve in which a portion of the other bar element is telescopically guided, the sleeve having a hand lever in pivotal connection therewith and a link pivotally connected between the hand lever and the other of said elements, the link being curved to span the pivotal connection between the hand lever and the sleeve whereby the hand lever tends to remain in a position in which the respective elements are drawn together.

References Cited by the Examiner
UNITED STATES PATENTS

| | | | |
|---|---|---|---|
| 1,663,228 | 6/1927 | Rogers | 88—24 |
| 2,461,058 | 2/1949 | Houston | 248—125 |
| 2,932,478 | 3/1960 | Krieger | 248—125 |
| 2,990,764 | 6/1961 | Wilder | 95—86 |

JOHN M. HORAN, *Primary Examiner.*